US012691306B2

(12) United States Patent
Safe et al.

(10) Patent No.: US 12,691,306 B2
(45) Date of Patent: Jul. 28, 2026

(54) FALL PROTECTION SUSPENSION TRAUMA RELIEF ASSEMBLY

(71) Applicant: 3M INNOVATIVE PROPERTIES COMPANY, St. Paul, MN (US)

(72) Inventors: Nathan W. Safe, Red Wing, MN (US); Stephen D. Shaver, Cottage Grove, MN (US); Christopher S. McLeod, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 671 days.

(21) Appl. No.: 17/766,888

(22) PCT Filed: Oct. 20, 2020

(86) PCT No.: PCT/IB2020/059867
§ 371 (c)(1),
(2) Date: Apr. 6, 2022

(87) PCT Pub. No.: WO2021/084383
PCT Pub. Date: May 6, 2021

(65) Prior Publication Data

US 2024/0100372 A1 Mar. 28, 2024

Related U.S. Application Data

(60) Provisional application No. 62/928,571, filed on Oct. 31, 2019.

(51) Int. Cl.
*A62B 35/00* (2006.01)

(52) U.S. Cl.
CPC ...... *A62B 35/0025* (2013.01); *A62B 35/0018* (2013.01); *A62B 35/0006* (2013.01); *A62B 35/0037* (2013.01)

(58) Field of Classification Search
None
See application file for complete search history.

(56) References Cited

U.S. PATENT DOCUMENTS 653,397 A * 7/1900 Pettjohn ............... A44C 5/2052 24/625
1,265,778 A * 5/1918 Hartline .................. A41F 11/04 24/701

(Continued)

FOREIGN PATENT DOCUMENTS

CN 2414650 Y 1/2001
CN 207404686 U 5/2018

(Continued)

OTHER PUBLICATIONS

"Now Available! Guardian Fall Protection Trauma Strap", The Guardian Fall Team Blog, Sep. 2016, [retrieved from the internet on Nov. 22, 2009], URL <https://www.guardianfall.com/blog/gf-team-blog/297-new-release-trauma-strap>, 1 page.

(Continued)

*Primary Examiner* — Phi D A
(74) *Attorney, Agent, or Firm* — Kenneth B. Wood

(57) ABSTRACT

There is provided a suspension trauma relief strap assembly for use in a fall protection harness comprising: a first housing integrally mounted within one side of the fall protection harness and configured to hold a strap, where the strap has a first end and a second end, and where the first end is operably connected to the first housing and the second end includes a connector; and a connection mechanism disposed on a second side of the fall protection harness, where the connection mechanism is configured to connect with the connector to form a connection assembly. There is also provided fall protection harnesses including these suspension trauma relief strap assemblies.

22 Claims, 8 Drawing Sheets

(56) References Cited

U.S. PATENT DOCUMENTS 1,419,043 A * 6/1922 Gray ........................ B60C 27/08 152/239
1,692,649 A * 11/1928 Goodridge ............. A44C 5/185 63/38
1,769,245 A * 7/1930 Tregoning .............. F16G 15/00 16/442
2,187,441 A * 1/1940 Baxter .................. F16B 45/036 24/600.9
2,853,759 A * 9/1958 Elsner .................... B64D 25/06 24/656
3,444,957 A * 5/1969 Ervin, Jr. ............... A62B 35/04 182/3
3,513,510 A * 5/1970 Copes ................ A44B 11/2515 24/116 R
3,869,021 A * 3/1975 Sutherland ......... A62B 35/0025 182/7
3,973,643 A * 8/1976 Hutchinson ........ A62B 35/0006 2/94
4,245,377 A * 1/1981 Soltes .................. A44C 5/2052 24/625
4,277,866 A * 7/1981 Song .................... A44C 5/2028 24/326
4,310,953 A * 1/1982 Nanasi ................. A44C 5/2052 24/656
4,369,551 A * 1/1983 Heredia ............... A01K 91/047 43/43.1
4,393,552 A * 7/1983 Frankel .................... A44C 5/20 24/627
4,923,149 A * 5/1990 Feher ..................... B64D 25/02 244/151 R
5,122,107 A * 6/1992 Gardner ............. A63B 23/0211 482/140
5,178,590 A * 1/1993 Stephens ............ A63B 69/0064 482/43
7,648,126 B2 * 1/2010 Lipke .................... F16G 11/046 254/389
8,056,675 B2 * 11/2011 Helms ................ A62B 35/0018 182/134
8,061,481 B2 11/2011 Wolner et al.
8,651,235 B2 * 2/2014 Wood ................. A62B 35/0025 182/5
8,663,135 B2 * 3/2014 Hirata ...................... A61H 3/00 24/303
9,492,692 B2 * 11/2016 Myers .................... A62B 35/00
9,937,367 B1 * 4/2018 Huang ............... A62B 35/0025
10,668,309 B2 * 6/2020 Starholm ........... A62B 35/0006
2006/0011415 A1 * 1/2006 Fischer .................... A62B 1/14 182/7
2006/0021381 A1 2/2006 Richardson
2006/0048998 A1 * 3/2006 Wolner .............. A62B 35/0018 182/3
2006/0207072 A1 9/2006 Chen
2007/0226967 A1 * 10/2007 Woods ............... A44B 11/2576 24/615
2007/0262636 A1 * 11/2007 Gastaldi ............... B60N 2/2887 297/463.1
2008/0000719 A1 * 1/2008 Jones ................. A62B 35/0075 182/3
2008/0156583 A1 * 7/2008 Meeks ............... A62B 35/0068 182/9
2009/0032333 A1 * 2/2009 Wolner .............. A62B 35/0018 182/3
2009/0255756 A1 * 10/2009 Green ................ A62B 35/0018 182/3
2010/0252361 A1 10/2010 Wood et al.
2010/0308604 A1 12/2010 Pauken et al.
2011/0067953 A1 * 3/2011 Kopp ................. A62B 35/0006 182/230
2015/0060196 A1 * 3/2015 Wolner .............. A62B 35/0018 182/3
2015/0251057 A1 * 9/2015 Frankhauser ............ A62B 1/14 182/134
2016/0236017 A1 * 8/2016 Gross ....................... A62B 1/10
2019/0192888 A1 * 6/2019 Christianson ........... A45F 5/021
2019/0388716 A1 12/2019 Barrow et al.
2020/0360739 A1 * 11/2020 Truesdell ........... A44B 13/0029

FOREIGN PATENT DOCUMENTS

EP 1798122 A1 6/2007
JP H05141202 6/1993
JP 2018126184 8/2018
WO WO-8910160 A * 11/1989 ......... A62B 35/0018
WO WO-9813104 A1 * 4/1998 ......... A62B 35/0018
WO 2007110581 A1 10/2007

OTHER PUBLICATIONS

International Search Report for PCT International Application No. PCT/IB2020/059867, mailed on Jan. 28, 2021, 3 pages.
Product Information: "Buckstep™ 2.0—105RSDK1", A Product of Buckingham Manufacturing, (Date unknown but believed to be prior to the date of the filing of the present application), [retrieved from the internet on Nov. 22, 2009], URL <https://buckinghammfg.com/products/buckstep-2-0-105rsdk1/>, 1 page.
Product Information: "Trauma Relief 5040", A Product of FallTech, (Date unknown but believed to be prior to the date of the filing of the present application), [retrieved from the internet on Nov. 22, 2009], URL <http://falltech.com/Product/5040>, 1 page.
Product Information: "Trauma Relief Strap Item # 85007", A Product of Elk River, 2017, [retrieved from the internet on Nov. 22, 2009], URL<https://www.elkriver.com/prod-19-1-818-242/trauma-relief-strap.htm>, 1 page.

* cited by examiner

FALL PROTECTION SUSPENSION TRAUMA RELIEF ASSEMBLY

CROSS REFERENCE TO RELATED APPLICATIONS

This application is a national stage filing under 35 U.S.C. 371 of PCT/IB2020/059867, filed Oct. 20, 2020, which claims the benefit of U.S. Provisional Patent Application No. 62/928,571, filed Oct. 31, 2019, the disclosure of which is incorporated by reference in its/their entirety herein.

FIELD

The present invention relates to a suspension trauma relief strap assembly for use with a fall protection harness.

BACKGROUND

Orthostatic intolerance, also commonly referred to as "suspension trauma", may include symptoms such as light-headedness, breathlessness, palpitations, tremulousness, poor concentration, fatigue, nausea, dizziness, headache, sweating, paleness, increased or unusually low heart rate, unusually low blood pressure, loss of vision, weakness, and faintness. While in a sedentary position, blood can accumulate in the veins, commonly referred to as "venous pooling", and cause orthostatic intolerance. Venous pooling typically occurs in the legs due to gravity and a lack of movement, and an accumulation of blood in the legs reduces the amount of blood in circulation throughout the rest of the body. The body reacts by speeding up the heart rate in an attempt to maintain sufficient blood flow to the brain. If the blood supply is sufficiently reduced, this reaction will not be effective. The body will abruptly slow the heart rate and the blood pressure will diminish in the arteries. During severe venous pooling, the reduction in quantity and/or quality of oxygen content in the blood flowing to the brain will cause one or more of the above-mentioned symptoms. This reduction of oxygen in the blood can also have an effect on other vital organs such as the kidneys, which may result in renal failure. If these conditions continue, they may be fatal.

Orthostatic intolerance may be experienced by workers using fall protection systems including fall protection harnesses. After a fall, a worker is suspended by the dorsal D-ring of the fall protection harness, and the worker is left suspended in a relatively vertical/upright position by the fall protection system until rescued. The worker may remain suspended in the fall protection harness for a length of time, and the sustained immobility may lead to a state of unconsciousness and/or any of the other above-mentioned symptoms. Depending upon the length of time the suspended worker is unconscious and/or immobile and depending upon the level of venous pooling, the resulting orthostatic intolerance may possibly lead to death. While not common, such fatalities are often referred to as "harness induced pathology".

Unconscious and/or immobile workers suspended in their harnesses will not be able to move their legs and will not fall into a horizontal position as they would if they were standing. While in the relatively vertical/upright position, venous pooling is more likely to occur and cause orthostatic intolerance, especially if the suspended worker is left in such a position for a length of time. If the worker is not rescued timely, in less than 30 minutes, venous pooling and orthostatic intolerance could result in serious injury or even death as the brain, the kidneys, and other organs are deprived of oxygen. Care must be taken during the rescue because moving the worker quickly into a horizontal position could cause cardiac arrest due to the abrupt increase in blood flow to the heart.

OSHA has suggested that footholds may be used to alleviate pressure on the workers' legs and provide support for "muscle pumping" to activate the leg muscles and reduce the risk of venous pooling. Therefore, fall protection harnesses incorporating such footholds or trauma relief assemblies are desirable to reduce risk of suspension trauma.

Conventional trauma relief assemblies are mounted on exteriors of fall protection harnesses resulting in potential abrasion or snagging hazards. Known trauma relief assemblies can also include multiple components requiring workers to use both hands when connecting and adjusting trauma relief assemblies.

There is a need for trauma relief assemblies that reduce potential abrasion or snagging hazards. There is also a need for trauma relief assemblies that are simpler and easier to connect and adjust, particularly when being used by workers suspended in fall protection harnesses.

SUMMARY

The present disclosure provides trauma relief assemblies that reduce potential abrasion or snagging hazards. The present disclosure also provides trauma relief assemblies that are simpler and easier to connect and adjust, particularly when being used by workers suspended in fall protection harnesses.

In one aspect, the present disclosure provides a suspension trauma relief strap assembly for use in a fall protection harness comprising: a first housing integrally mounted within one side of the fall protection harness and configured to hold a strap, wherein the strap has a first end and a second end, and wherein the first end is operably connected to the first housing and the second end includes a connector; and a connection mechanism disposed on a second side of the fall protection harness, wherein the connection mechanism is configured to connect with the connector to form a connection assembly. In some embodiments, the connection mechanism is removably disposed on the second side of the fall protection harness. In some embodiments, the connection mechanism is integrally mounted within the second side of the fall protection harness.

In some embodiments, the connection mechanism is disposed within a second housing. In some embodiments, the second housing is removably disposed on the second side of the fall protection harness. In some embodiments, the second housing is integrally mounted within the second side of the fall protection harness.

In some embodiments, the connection assembly is selected from at least one of a suspender assembly, a clip and ring assembly, a slot assembly, and a guy-line assembly. In some embodiments, the slot assembly is selected from at least one of a T-slot assembly and a ball joint assembly. In some embodiments, the suspender assembly is selected from at least one of a circular suspender assembly, and a diamond suspender assembly. In some embodiments, the strap may withstand at least 227 kilograms (500 pounds) of weight.

In another aspect, the present disclosure provides a fall protection harness comprising a suspension trauma relief strap assembly, wherein the suspension trauma relief strap assembly comprises: (a) a first housing integrally mounted within one side of the fall protection housing and configured to hold a strap, wherein the strap has a first end and a second end, and wherein the first end is operably connected to the first housing and the second end includes a connector; and (b) a connection mechanism disposed on a second side of the fall protection harness, wherein the connection mechanism is configured to connect with the connector to form a connection assembly. These fall protection harnesses may include all of the aforementioned embodiments.

In yet another aspect, the present disclosure provides a suspension trauma relief strap assembly for use with a fall protection harness having shoulder straps, leg straps, a seat strap, and a dorsal D-ring, the dorsal D-ring being operatively connected to the shoulder straps proximate a rear portion of the fall protection harness, the seat strap interconnecting the shoulder straps, the leg straps being operatively connected to the seat strap, wherein a worker donning the fall protection harness is suspended in a relatively upright position by the dorsal D-ring when a fall occurs, the dorsal D-ring pulling the fall protection harness upward relative to the worker, the fall protection harness placing pressure on the worker, the suspension trauma relief strap assembly comprising: a first housing integrally mounted within one side of the fall protection housing and configured to hold a strap, wherein the strap has a first end and a second end, and wherein the first end is operably connected to the first housing and the second end includes a connector; and a connection mechanism disposed on a second side of the fall protection harness, wherein the connection mechanism is configured to connect with the connector to form a connection assembly. In some embodiments, the connection assembly is formed the worker can stand on the strap. These suspension trauma relief strap assemblies may include all of the aforementioned embodiments

BRIEF DESCRIPTION OF THE DRAWINGS

By way of example only, embodiments of the present disclosure will now described below with reference to the accompanying drawings, in which.

DETAILED DESCRIPTION

Figure 1:
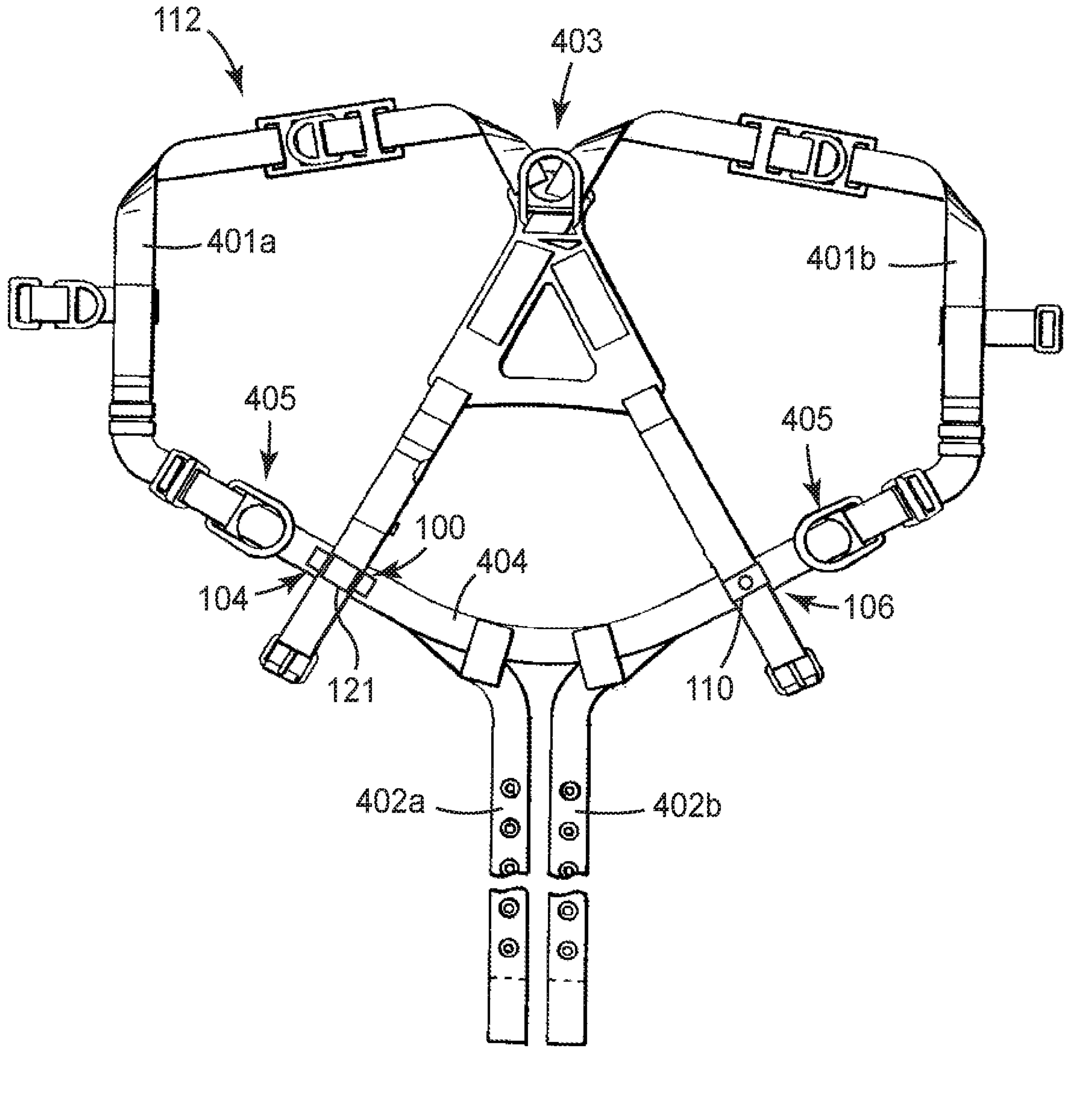
FIG. 1 is a front view of a suspension trauma relief strap assembly according to the present disclosure.

Before any embodiments of the present disclosure are explained in detail, it is to be understood that the present disclosure is not limited in its application to the details of construction and the arrangement of components set forth in the following description. The present disclosure is capable of other embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. Any numerical range recited herein includes all values from the lower value to the upper value. For example, if a percentage is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are considered to be expressly stated in this application.

In the present detailed description, reference is made to the accompanying drawings, which illustrate specific embodiments in which the presently disclosed devices may be practiced. The illustrated embodiments are not intended to be exhaustive of all embodiments according to the present disclosure. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate", "distal", "lower", "upper", "beneath", "below", "above", and "on top", if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on", "connected to", "coupled with", "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. As used herein the term "operably connected" means removably attached or permanently attached.

Fall protection harnesses are known in the art, and it is recognized that the presently disclosed suspension trauma relief assembly may be used with many different styles of fall protection harnesses. A fall protection harness 112 that may be used in the present disclosure is shown in FIG. 1 and includes shoulder straps 401*a* and 401*b*, leg straps 402*a* and 402*b*, a dorsal D-ring 403, and a seat strap 404. Shoulder straps 401*a* and 401*b* criss-cross in divergent fashion at a juncture proximate the rear portion of harness 112, and dorsal D-ring 403 is operatively connected to shoulder straps 401*a* and 401*b* proximate the juncture. Seat strap 404 interconnects shoulder straps 401*a* and 401*b*, and leg straps 402*a* and 402*b* are operatively connected to seat strap 404. Side D-rings 405 may also be operatively connected to seat strap 404.

Figure 1A:
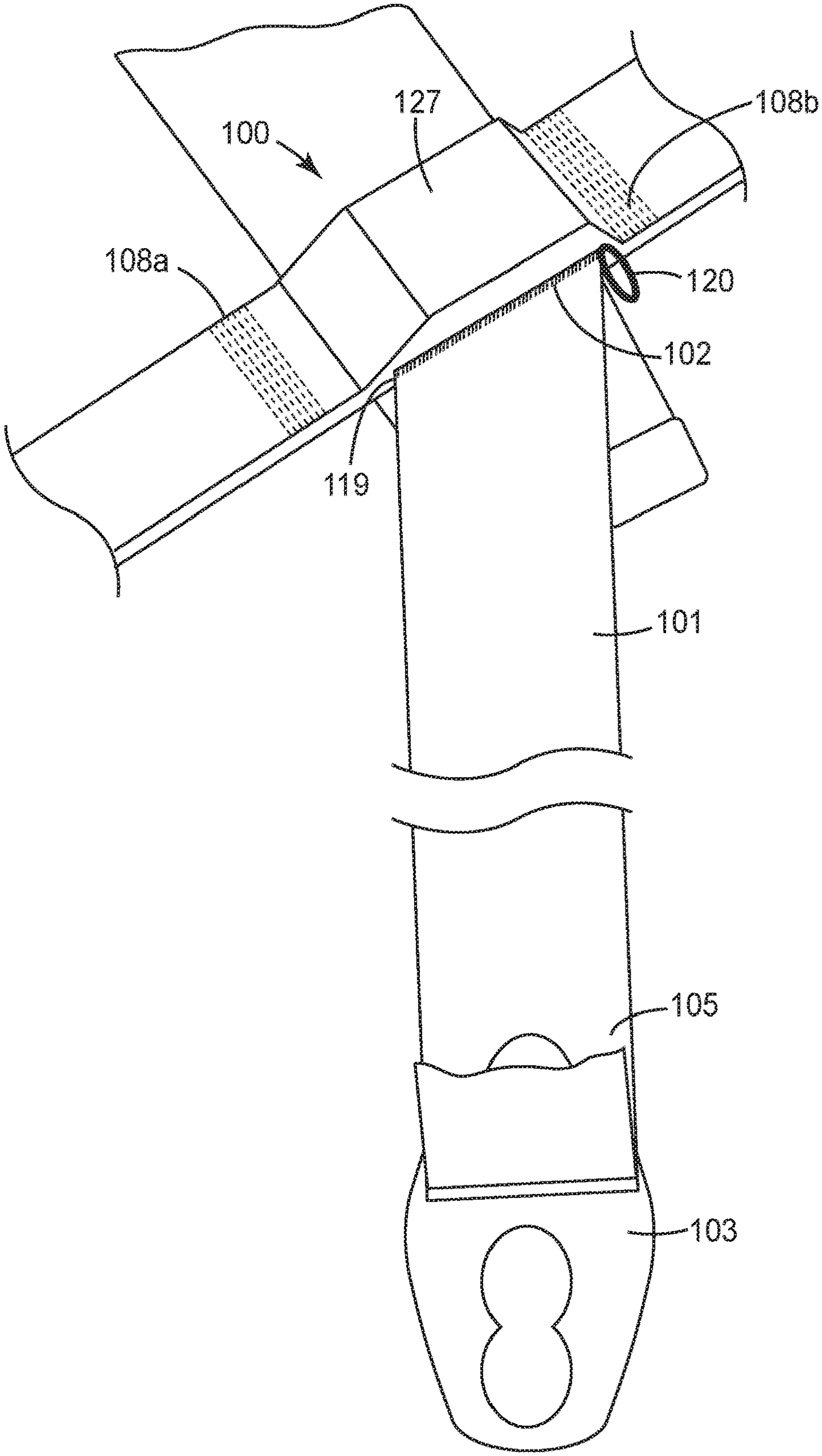
FIG. 1A is a perspective view of a first housing with a deployed strap and connector according to some embodiments of presently disclosed suspension trauma relief assembly.

Referring now to FIGS. 1 and 1A, suspension trauma relief strap assemblies useful in the present disclosure include a first housing 100 integrally mounted within one side 104 of the fall protection harness 112 and configured to hold a strap 101, where strap 101 has a first end 102 and a second end 105. First end 102 is operably connected to first housing 100 and second end 105 includes a connector 103. Presently disclosed suspension trauma relief strap assemblies also include a connection mechanism 110 disposed on a second side 106 of fall protection harness 112, where connection mechanism 110 is configured to connect with connector 103 to form a connection assembly.

Figure 2:
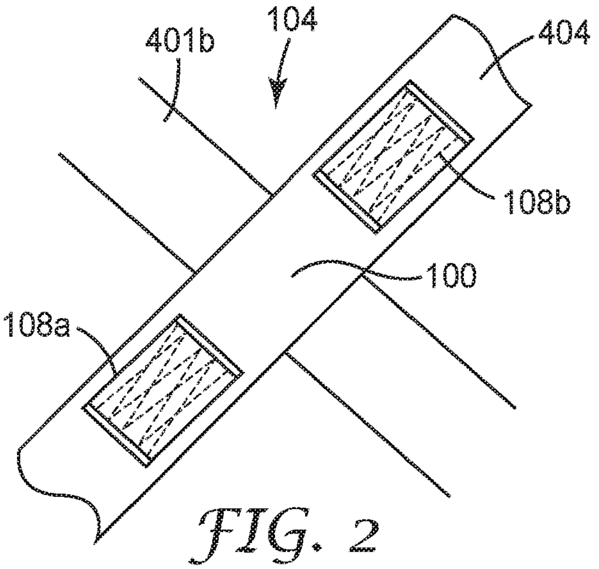
FIG. 2 is a top view of first housing operably disposed on a portion of a fall protection harness according to presently disclosure.
Figure 3:
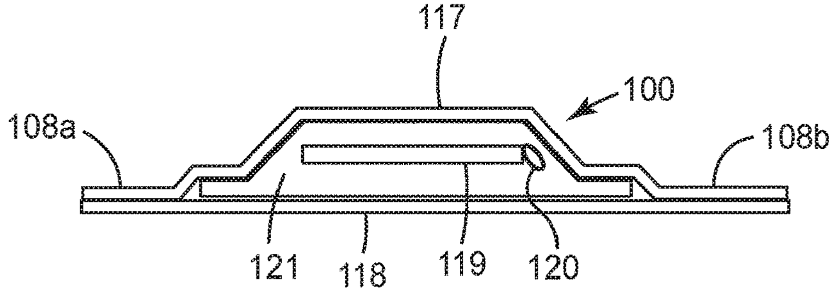
FIG. 3 is a side view of the first housing shown in FIG. 2.

As shown in FIGS. 2 and 3, in some embodiments, first housing 100 of suspension trauma relief strap assembly is integrally mounted within one side 104 of fall protection harness (not shown). In some examples, first housing 100 is integrally mounted to seat strap 404 of fall protection harness where seat strap 404 intersects with one of shoulder straps 401*a* (not shown) or 401*b*. In some examples, first housing 100 is integrally mounted to seat strap using stitching 108*a* and 108*b*. Stitching useful in the present disclosure is preferably capable of maintaining a load of at least 227 kilograms (500 pounds).

As shown in FIG. 3, in some embodiments, side 118 of first housing 100 can be fixedly or removably attached to one of should strap 401*a* (not shown) or 401*b* while side 117 of first housing can be fixedly or removably attached to seat strap 404, such that first housing 100 is mounted substantially within these components (401*a* or 401*b*, and 404) of fall protection harness. In this example, closure mechanism 120 disposed along slot 119 is accessible to worker along distal face 121 of first housing 100.

Straps 101 useful in the present disclosure include those made from lightweight materials. For example, straps 101 can be made using rope, cord, cable, webbing and the like. In some embodiments, straps 101 are made using cord, such as light weight and easy to compact cord. Example of light weight and easy to compact cord include nylon cord and cord made using high tenacity exotic yams, such as those commercially available under the trade designation "DYNEEMA" from DSM, Heerlen, Netherlands. In some embodiments, straps 101 of the presently disclosed suspension trauma relief strap assemblies are made of % inch nylon webbing having a minimum tensile strength of 900 pounds. In some embodiments, straps useful in the present disclosure may withstand at least 227 kilograms (500 pounds) of weight. In some embodiments, straps useful in the present disclosure are made of nylon cord and may withstand at least 227 kilograms (500 pounds) of weight.

In some embodiments, connection mechanisms 110 useful in the present disclosure can be removably disposed on second side 106 of fall protection harness 112. For example, connection mechanism 110 can be removably attached to fall protection harness 112 using conventional fasteners, such as for example buckles, snaps, zippers, hook and loop fasteners, and the like. In some embodiments, connection mechanisms 110 useful in the present disclosure can be integrally mounted within second side 106 of fall protection harness 112. For example, connection mechanism 110 can be integrally mounted within second side 106 of fall protection harness 112 using any conventional permanent attachment means, such as stitching, gluing, ultrasonic welding, and the like.

In some embodiments, connection mechanism 110 is disposed within a second housing where second housing is disposed on a second side 106 of fall protection harness 112. In some embodiments, the second housing is removably disposed on second side 106 of fall protection harness 112. For example, second housing can be removably disposed on second side 106 of fall protection harness 112 using conventional fasteners, such as for example buckles, snaps, zippers, and the like.

In some embodiments, the second housing is integrally mounted within the second side 106 of fall protection harness 112. For example, second housing can be integrally mounted within second side 106 of fall protection harness 112 using any conventional permanent attachment means, such as stitching, gluing, and the like.

Figure 1B:
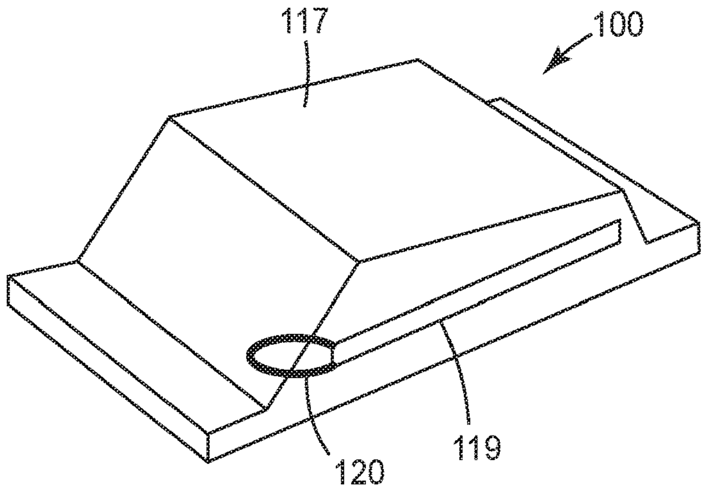
FIG. 1B is perspective view of the first housing from FIG. 1A with strap and connector disposed within first housing according to some embodiments of presently disclosed suspension trauma relief assembly.

FIG. 1B illustrates an embodiment of first housing 100 containing strap 101, which is accessible by opening slot 119. Slot 119 can be opened and closed using any conventional closures mechanism 120, such as for example, a zipper, snaps, hook and loop closures, and the like. In some examples, strap 101 can be manually partially removed from first housing 100 when worker opens closure mechanism 120 and pulls connector 103 and second end 105 of strap out of first housing 100 via slot 119.

Strap 101 is preferably wound into a configuration, not shown, with connector 103 and second end 105 proximate the center of spiral configuration and packed into first housing 100. In some embodiments, connector 103 is taken from the center of the configuration and placed proximate slot 119 inside first housing 100 so connector 103 is readily accessible to be pulled, together with strap 101, out of first housing 100 via slot 119. In some embodiments, a pull tab (not shown) can be used to pull connector 103 and strap 101 out of first housing 100. In this example, pull tab should also be readily accessible proximate slot 119 to pull connector 103 and strap 101 out of first housing 100 via slot 119.

Figure 4:
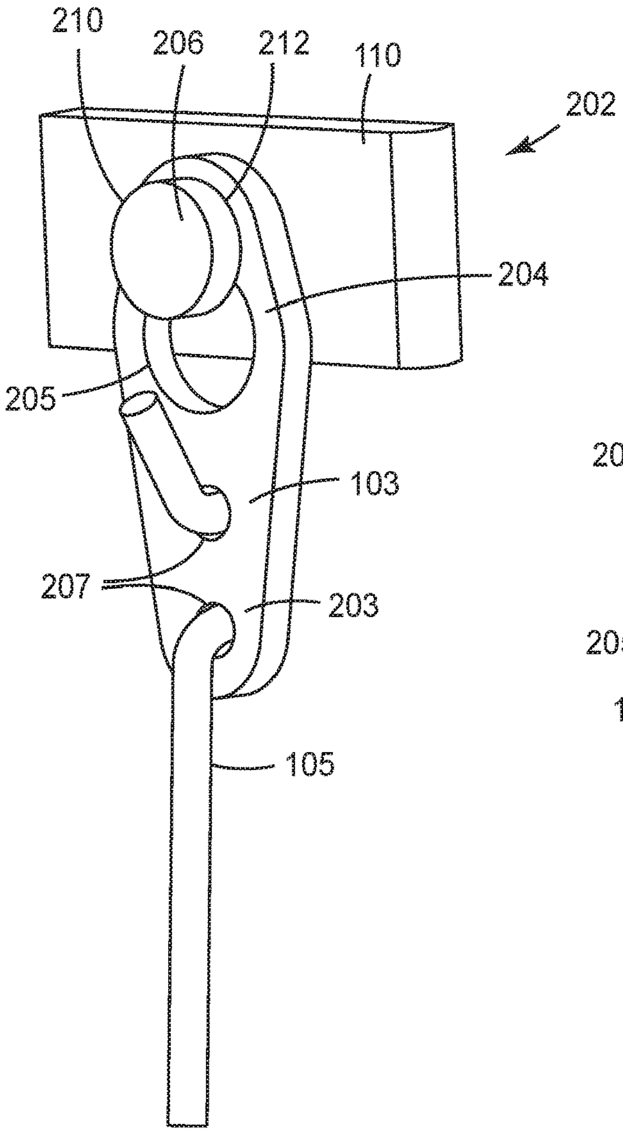
FIG. 4 is a perspective view of a suspender assembly according to the present disclosure.
Figure 5A:
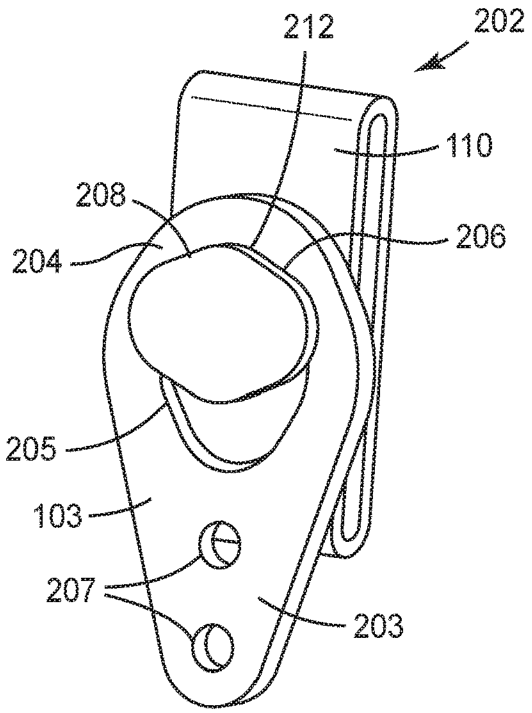
FIG. 5A is a perspective view of a suspender assembly according to the present disclosure.
Figure 5B:
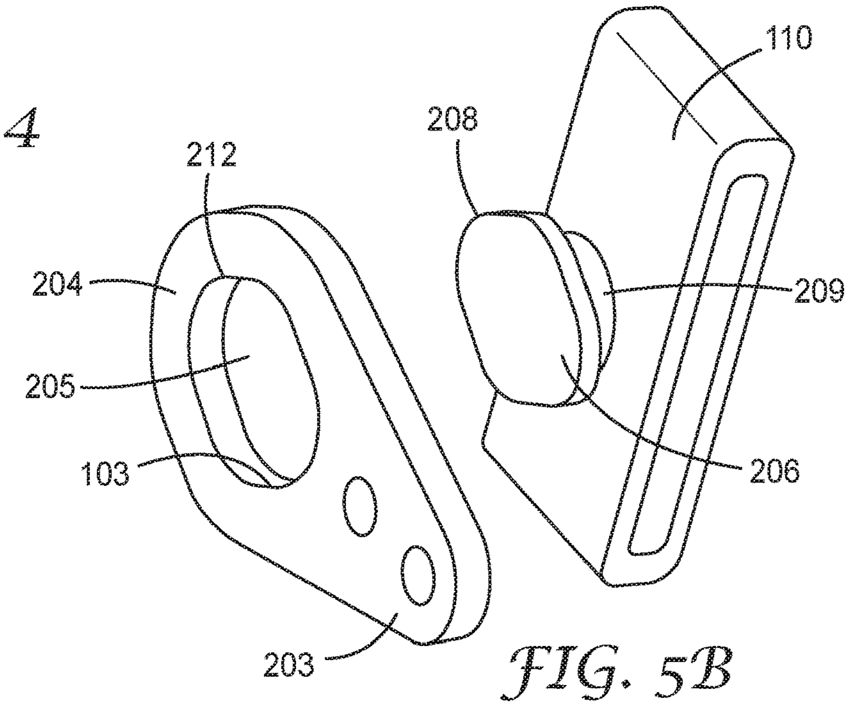
FIG. 5B is an exploded view of suspender assembly shown in FIG. 5A.

Connection assemblies useful in the present disclosure include those selected from at least one of suspender assemblies, clip and ring assemblies, a slot assemblies, and guyline assemblies. Referring now to FIGS. 4 through 7, 8A and 9A, there are shown various embodiments of connection assemblies useful in the present disclosure. Referring now to FIGS. 4, 5A and 5B suspender assemblies 202 useful in the present disclosure include those selected from at least one of circular suspender assemblies and diamond suspender assemblies.

FIG. 4 shows an exemplary circular suspender assembly 202 useful in the present disclosure. FIGS. 5A and 5B show an exemplary diamond suspender assembly 202 useful in the present disclosure. As shown in FIGS. 4, 5A and 5B, connector 103 useful in circular or diamond suspender assembly 202 has a distal portion 203 and a proximal portion 204. Distal portion 203 of connector 103 is operably connected to strap 101. In some embodiments, strap 101 is removably attached to distal portion 203 of connector 103 using one or more opening 207 in distal portion 203 through which strap 101 can be fed. In some embodiments, strap 101 is fixedly attached to or integral with distal portion 203 of connector 103 using any conventional means for such attachment or integration of hard good or soft good components.

Proximal portion 204 of connector 103 has an opening 205. Opening is configured to mate with a protrusion 206 on connection mechanism 110. Protrusion 206 and corresponding opening 205 may have any shape provided that they mate together to form suspender connection assembly 202. For example, as shown in FIG. 5B, exemplary protrusion 206 is substantially diamond shaped having a perimeter of a diamond portion 208 of protrusion furthest away from connection mechanism 110 that is larger than a perimeter of a neck 209 of protrusion. Shape and perimeter of diamond portion 208 matches shape and perimeter of opening 205 such that worker can insert diamond portion 208 of protrusion 206 on connection mechanism through opening 205 in connector 103. In some embodiments, diamond portion 208 only fits through opening 205 when connector 103 is rotated to some degree away from position of connector in use. For example, as shown in FIG. 5B, diamond portion 208 fits through opening 205 of connector 103 when connector 103 is rotated 90 degrees from use position shown in FIG. 5A. Once diamond portion 208 slides through opening 205 in connector 103, a proximal edge 212 of opening 205 engages neck 209 of protrusion 206 thereby creating a suspender assembly 202 style of connection assembly 200.

Referring now to FIG. 4, a circular portion 210 of protrusion 206 is used in a manner substantially similar as that described above for diamond portion 208 shown in FIGS. 5A and 5B. In this manner, one of skill can appreciate that various provided that they mate together to form suspender connection assembly 202.

Figure 6:
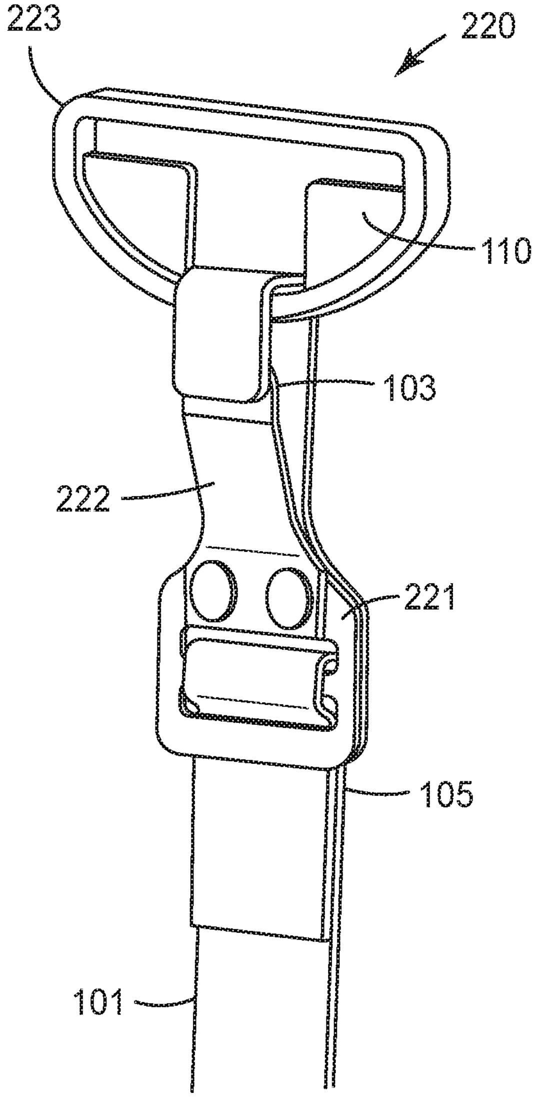
FIG. 6 is a perspective view of a clip and ring assembly according to the present disclosure.

Referring now to FIG. 6, in some embodiments, clip and ring assemblies 220 are useful connection assemblies 200 in the present disclosure. In some examples, second end 105 of strap operably connects to connector 103, where connector 103 is a clip. Exemplary clips useful in the present disclosure include those having a buckle 221 to operably connect strap 101 to the clip and a depressible member 222. Worker can press depressible member 222 on clip to engage a ring 223 disposed on connection mechanism 110. Once the clip engages ring 223, worker can remover pressure on depressible member 222 such that it will be biased to close the clip around ring 223 thereby creating a clip and ring assembly 220 style of connection assembly 200.

Figure 7:
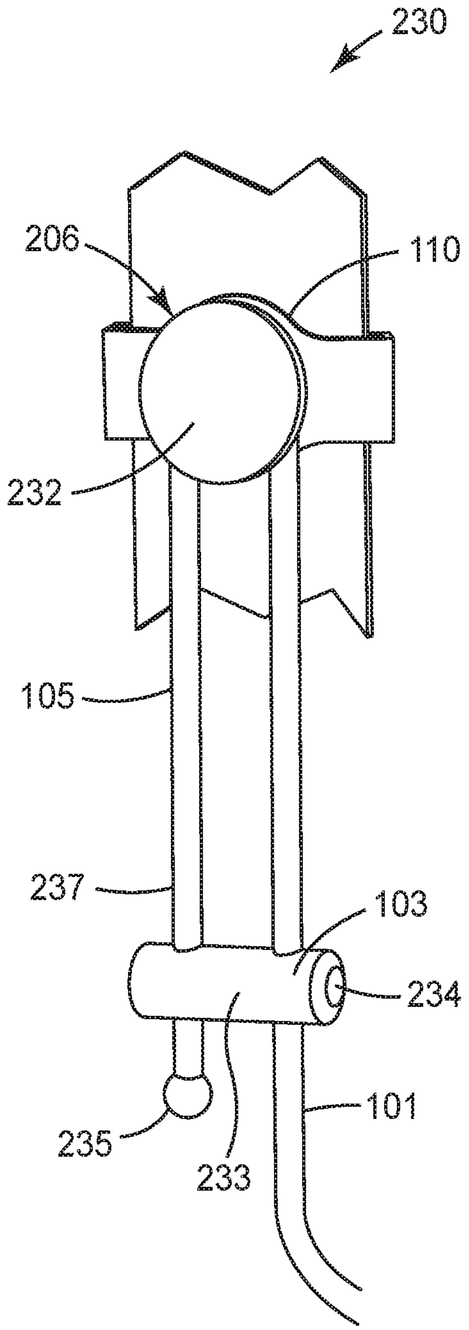
FIG. 7 is a perspective view of a guy-line assembly according to the present disclosure.

Referring now to FIG. 7, in some embodiments, guy-line assemblies 230 are useful connection assemblies 200 in the present disclosure. In some examples, second end 105 of strap 101 wraps around a protrusion 206 on connection mechanism 110. Protrusion 206 may have any shape provided that perimeter of a portion 232 of protrusion 206 furthest away from connection mechanism 110 is larger than a perimeter of a neck (not shown) of protrusion 206 closest to connection mechanism 110. With this configuration strap 110 is prevented from sliding off protrusion 206 when wrapped around neck. One of skill in the art can appreciate that protrusion 206 can be any shape or size provided that strap 110 is prevented from sliding off protrusion 206 when strap 110 is wrapped around protrusion 206.

Still referring to FIG. 7, guy-line assemblies 230 useful in the present disclosure also provide a biasing member 233 used to help keep strap 101 wrapped around protrusion 206. Exemplary biasing member 233 has a depressible end 234, such that when worker presses depressible end 234, biasing member 233 can slide up and down at least one length of strap 110. In some examples, biasing member 233 moves along both an unwrapped portion 236 of strap 101 and a wrapped portion 237 of strap when worker presses depressible end 234 and slides biasing member 233 along strap 101. Once positioned in a desirable position, worker can release pressure on depressible end 234 thereby securing biasing member 233 on strap 101. In some examples, second end 105 of strap 110 is terminated with a stop 235, such that strap 110 cannot slide through openings in biasing member 233. Once strap 101 is wrapped around protrusion 206 and biasing member 233 is slide into place, guy-line assembly 230 style of connection assembly 200 is formed.

Figure 8:
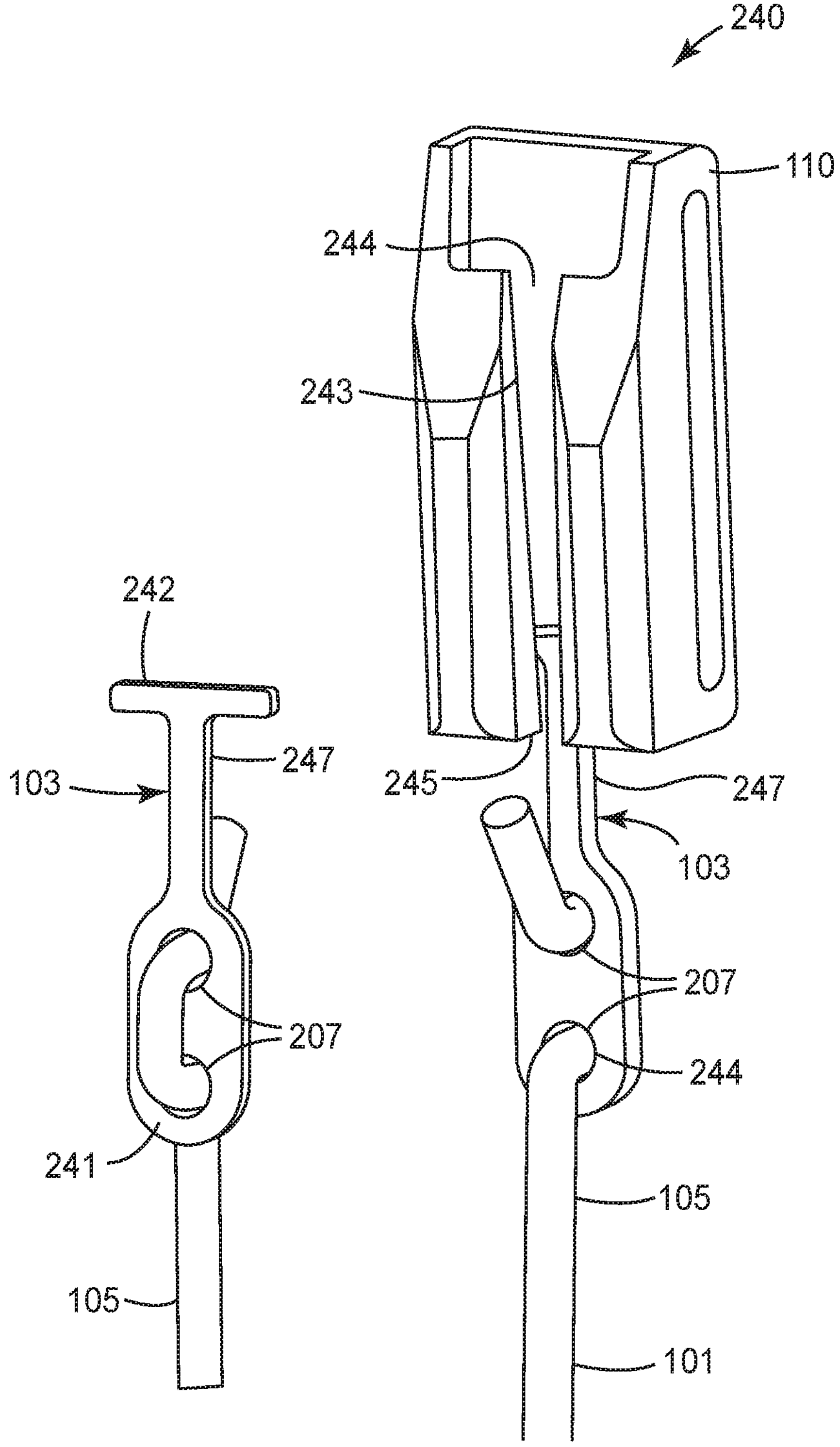
FIG. 8 is a perspective view of a slot assembly according to the present disclosure.
Figure 9A:
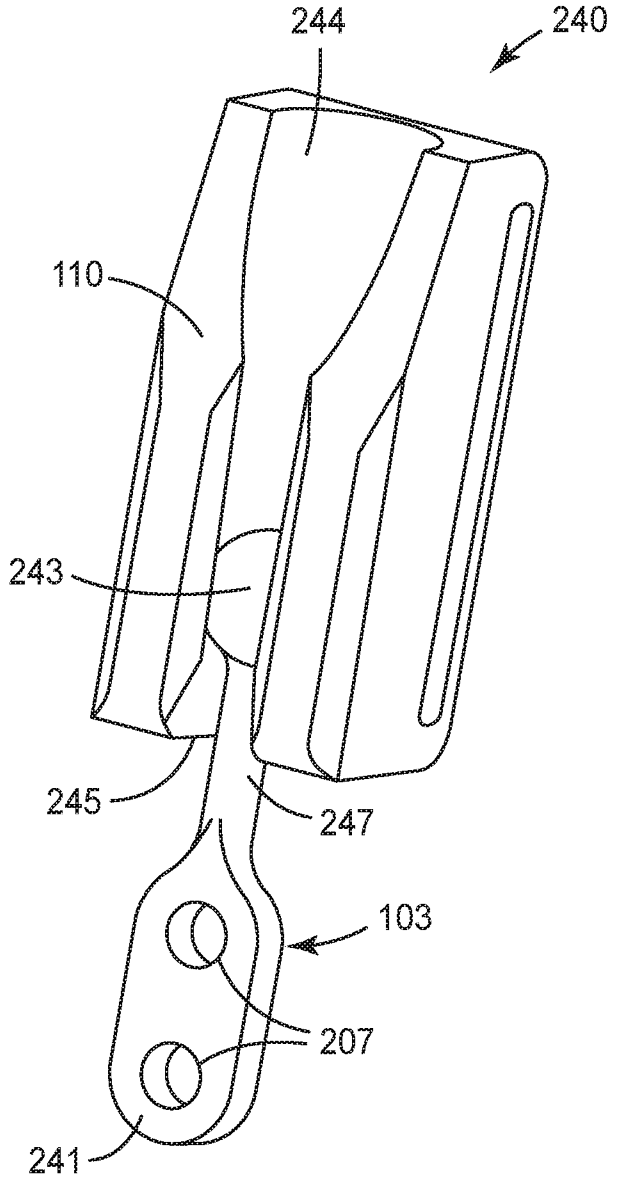
FIG. 9A is a perspective view of a slot assembly according to the present disclosure.
Figure 9B:
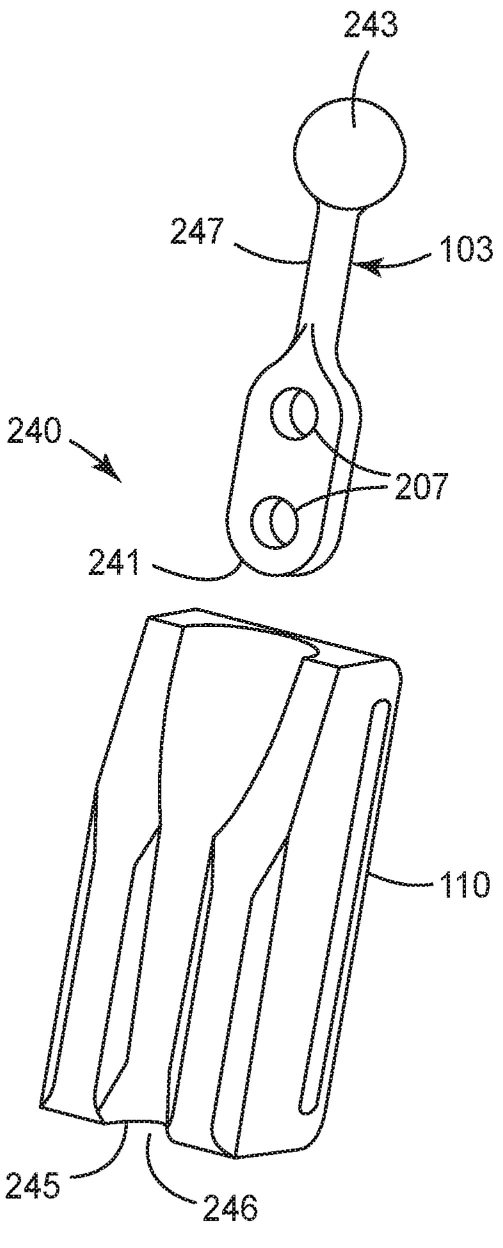
FIG. 9B is an exploded view of slot assembly shown in FIG. 9A.

Referring now to FIGS. 8, 9A and 9B, in some embodiments, slot assemblies 240 are useful connection assemblies 200 in the present disclosure. In some examples, slot assembly 240 is selected from at least one of a T-slot assembly and a ball joint assembly. Connector 103 useful in slot assembly 240 has a distal portion 241 and a proximal portion 242. Distal portion 241 of connector 103 is operably connected to strap 101. In some embodiments, strap 101 is removably attached to distal portion 241 of connector 103 using one or more opening 207 in distal portion 241 through which strap 101 can be fed. In some embodiments, strap 101 is fixedly attached to or integral with distal portion 241 of connector 103 using any conventional means for such attachment or integration of hard good or soft good components.

Proximal portion 242 of connector 103 has an engagement portion 243. FIG. 8 depicts some embodiments in which engagement portion 243 is T-shaped. FIGS. 9A and 9B depict some embodiments in which engagement portion 243 is sphere-shaped. Engagement portion 243 useful in the present disclosure can have any shape or size provided that engagement portion 243 engages with a slot 244 in connection mechanism 110. Slot 244 is configured such that it receives engagement portion 243 of connector 103, allowing engagement portion 243 to slide to a terminating end 245 of slot 244 having an opening 246. Opening 246 in terminating end 245 of slot 244 is sized such that it allows a neck 247 of connector 103 through but does not allow engagement portion 243 through. Once engagement portion 243 slides through slot 244 and catches at terminating end 245 of slot such that neck 247 fits through opening 246, a slot assembly 240 style connection assembly 200 is created.

Figure 10:
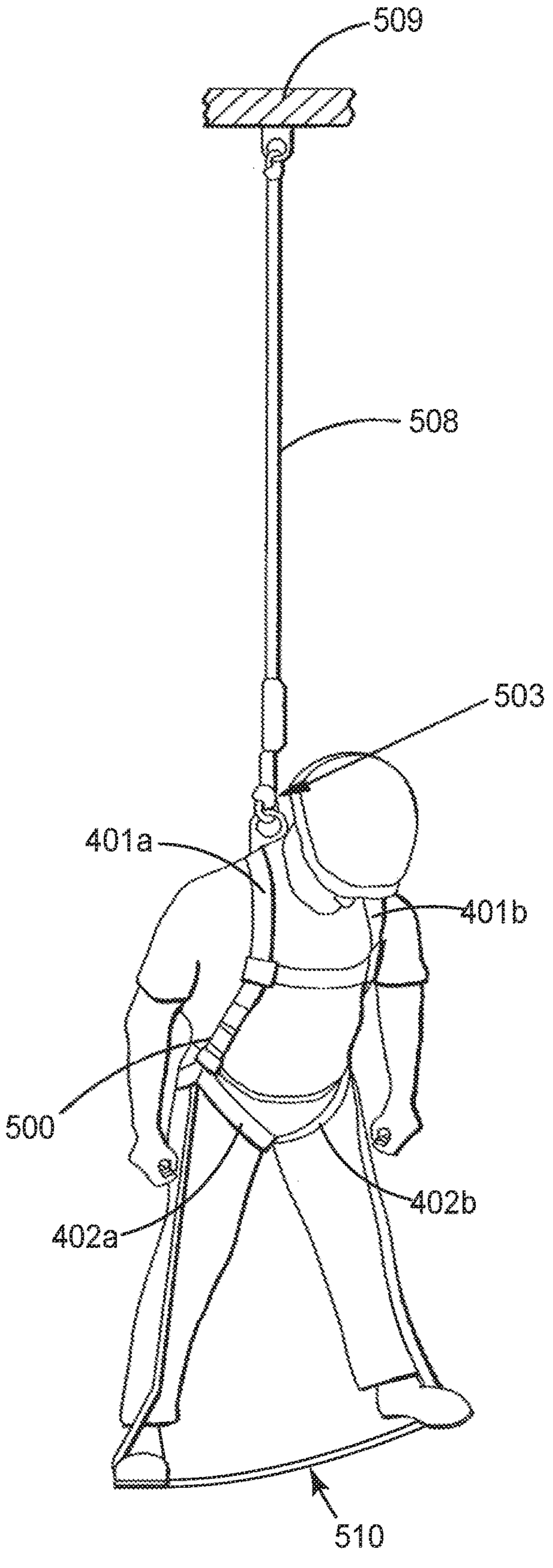
FIG. 10 is a perspective view of a worker donning a full body harness and utilizing presently disclosed suspension trauma relief strap assembly while suspended from a support structure.

After occurrence of a fall, as shown in FIG. 10, a worker donning fall protection harness 500 is suspended in a relatively upright position from a support structure 509 by a lanyard 508 operatively connected to the dorsal D-ring 503 of fall protection harness 500. Dorsal D-ring 503 tends to pull the shoulder straps 401*a* and 401*b* of fall protection harness 500 upward relative to the worker, which places pressure on the worker's body. Pressure will likely be placed on the inner thighs of the worker by the leg straps 402*a* and 402*b* of fall protection harness 500. When suspended by the dorsal D-ring 503, and if rescue is not imminent, the worker (if conscious) may choose to use the presently disclosed suspension trauma relief strap assembly 510 to reduce the risk of suspension trauma.

In operation, closure mechanism 120 is opened and to expose strap 101 within first housing 100. If a pull tab is present, the pull tab is pulled to release strap 101 from first housing 100 and from the compact configuration. If a pull tab is not present, connector 103 or second end 105 of strap 101 is pulled to release strap 101 from first housing 100 and from the compact configuration. Connector 103 engaged with connection mechanism 110 to form a connection assembly 200, 202, 220, 230 240, which results in formation of a sling. Length of the sling can be adjusted by workers before strap 101 and connector 103 are stowed in first housing 100, by adjusting length of strap 101 during use, or a combination thereof. Worker may "stand" on sling while suspended in fall protection harness. In some examples, presently disclosed trauma relief strap assemblies 510 can be deployed by workers using only one hand. In some examples, presently disclosed trauma relief strap assemblies 510, can be integrated into fall protection harness to avoid abrasion and snagging. In some examples, presently disclosed trauma relief strap assemblies 510 can provide a strap for workers to stand on rather than a connector or some other component. In some examples, presently disclosed trauma relief strap assemblies 510 provide any combination, including all three, of these benefits to workers at the same time.

Due to the fall, the worker is suspended by the dorsal D-ring, which pulls the shoulder straps upward and/or taut proximate the back of the worker. The sling is operatively connected to the portions of the shoulder strap being pulled by the dorsal D-ring (proximate the ends of the rear portions of the shoulder straps above the junctures with the seat strap), and when the worker "stands" on the sling, the pressure extends from the dorsal D-ring to the sling rather than to the worker. This allows for the load or the pressure to be taken off the worker's body and the other straps of the fall protection harness because the load is applied from the dorsal D-ring to the sling instead. As a result, the other straps of the fall protection harness loosen so as to not constrict the worker's body when suspended. By using the suspension relief strap assembly, the worker is able to "stand" on the provided sling to relieve the pressure from the fall protection harness and reduce the risk of suspension trauma.

The suspension relief strap assembly of the present disclosure may be retrofittable to accommodate most styles of fall protection harnesses. In some embodiments, the presently disclosed suspension relief strap assembly is reusable on another fall protection harness should a fall occur and the fall protection harness must be discarded. The presently disclosed suspension relief strap assembly may also be sewn directly onto the fall protection harness rather than used as a retrofit, reusable accessory.

Following are non-limiting examples of the present disclosure:

Example 1. A suspension trauma relief strap assembly for use in a fall protection harness having:

a) a first housing integrally mounted within one side of the fall protection harness and configured to hold a strap, where the strap has a first end and a second end, and where the first end is operably connected to the first housing and the second end includes a connector; and b) a connection mechanism disposed on a second side of the fall protection harness, where the connection mechanism is configured to connect with the connector to form a connection assembly.

Example 2. The suspension trauma relief strap assembly of Example 1, where the connection mechanism is removably disposed on the second side of the fall protection harness.

Example 3. The suspension trauma relief strap assembly of Example 1, where the connection mechanism is integrally mounted within the second side of the fall protection harness.

Example 4. The suspension trauma relief strap assembly of Example 1, where the connection mechanism is disposed within a second housing.

Example 5. The suspension trauma relief strap assembly of Example 4, where the second housing is removably disposed on the second side of the fall protection harness.

Example 6. The suspension trauma relief strap assembly of Example 4, where the second housing is integrally mounted within the second side of the fall protection harness.

Example 7. The suspension trauma relief strap assembly of the preceding Example, where the connection assembly is selected from at least one of a suspender assembly, a clip and ring assembly, a slot assembly, and a guy-line assembly.

Example 8. The suspension trauma relief strap assembly of Example 7, where the slot assembly is selected from at least one of a T-slot assembly and a ball joint assembly.

Example 9. The suspension trauma relief strap assembly of Example 7, where the suspender assembly is selected from at least one of a circular suspender assembly, and a diamond suspender assembly.

Example 10. The suspension trauma relief strap assembly of any of the preceding Examples, where the strap may withstand at least 227 kilograms (500 pounds) of weight.

Example 11. A fall protection harness having a suspension trauma relief strap assembly, where the suspension trauma relief strap assembly comprises:

(a) a first housing integrally mounted within one side of the fall protection housing and configured to hold a strap, where the strap has a first end and a second end, and where the first end is operably connected to the first housing and the second end includes a connector; and (b) a connection mechanism disposed on a second side of the fall protection harness, where the connection mechanism is configured to connect with the connector to form a connection assembly.

Example 12. The fall protection harness of Example 11, where the connection mechanism is removably disposed on the second side of the fall protection harness.

Example 13. The fall protection harness of Example 11, where the connection mechanism is integrally mounted within the second side of the fall protection harness.

Example 14. The fall protection harness of Example 11, where the connection mechanism is disposed within a second housing.

Example 15. The fall protection harness of Example 14, where the second housing is removably disposed on the second side of the fall protection harness.

Example 16. The fall protection harness of Example 14, where the second housing is integrally mounted within the second side of the fall protection harness.

Example 17. The fall protection harness of any of Examples 11 to 16, where the connection assembly is selected from at least one of a suspender assembly, a clip and ring assembly, a slot assembly, and a guy-line assembly.

Example 18. The fall protection harness of Example 17, where the slot assembly is selected from at least one of a T-slot assembly and a ball joint assembly.

Example 19. The fall protection harness of Example 17, where the suspender assembly is selected from at least one of a circular suspender assembly, and a diamond suspender assembly.

Example 20. The suspension trauma relief strap assembly of any of Examples 11 to 19, where the strap may withstand at least 227 kilograms (500 pounds) of weight.

Example 21. A suspension trauma relief strap assembly for use with a fall protection harness having shoulder straps, leg straps, a seat strap, and a dorsal D-ring, the dorsal D-ring being operatively connected to the shoulder straps proximate a rear portion of the fall protection harness, the seat strap interconnecting the shoulder straps, the leg straps being operatively connected to the seat strap, where a worker donning the fall protection harness is suspended in a relatively upright position by the dorsal D-ring when a fall occurs, the dorsal D-ring pulling the fall protection harness upward relative to the worker, the fall protection harness placing pressure on the worker, the suspension trauma relief strap assembly having:

(a) a first housing integrally mounted within one side of the fall protection housing and configured to hold a strap, where the strap has a first end and a second end, and where the first end is operably connected to the first housing and the second end includes a connector; and (b) a connection mechanism disposed on a second side of the fall protection harness, where the connection mechanism is configured to connect with the connector to form a connection assembly.

Example 22. The suspension trauma relief strap assembly of Example 21, where when the connection assembly is formed the worker can stand on the strap.

Example 23. The fall protection harness of Example 21 or 22, where the connection mechanism is removably disposed on the second side of the fall protection harness.

Example 24. The fall protection harness of Example 21 or 22, where the connection mechanism is integrally mounted within the second side of the fall protection harness.

Example 25. The fall protection harness of Example 21 or 22, where the connection mechanism is disposed within a second housing.

Example 26. The fall protection harness of Example 25, where the second housing is removably disposed on the second side of the fall protection harness.

Example 27. The fall protection harness of Example 25, where the second housing is integrally mounted within the second side of the fall protection harness.

Example 28. The fall protection harness of any of Examples 21 to 27, where the connection assembly is selected from at least one of a suspender assembly, a clip and ring assembly, a slot assembly, and a guy-line assembly.

Example 29. The fall protection harness of Example 28, where the slot assembly is selected from at least one of a T-slot assembly and a ball joint assembly.

Example 30. The fall protection harness of Example 28, where the suspender assembly is selected from at least one of a circular suspender assembly, and a diamond suspender assembly.

Example 31. The suspension trauma relief strap assembly of any of Examples 21 to 30, where the strap may withstand at least 227 kilograms (500 pounds) of weight.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A fall-protection harness comprising a suspension trauma relief strap assembly comprising:

a) a first housing integrally mounted within one side of the fall protection harness and configured to hold a strap, a strap that is held within the first housing, wherein the strap has a first end and a second end, and wherein the first end is operably connected to the first housing and the second end includes a connector; and b) a connection mechanism disposed on a second side of the fall protection harness, wherein the connection mechanism is configured to connect with the connector to form a connection assembly;

and wherein the first housing is non-removably fixed to a shoulder strap of the fall protection harness at a location where a seat strap of the harness intersects with the shoulder strap of the harness so that the first housing is sandwiched between the seat strap and the shoulder strap.

2. The fall-protection harness of claim 1, wherein the connection mechanism is removably disposed on the second side of the fall protection harness.

3. The fall-protection harness of claim 1, wherein the connection mechanism is integrally mounted within the second side of the fall protection harness.

4. The fall-protection harness of claim 1, wherein the connection mechanism is disposed within a second housing.

5. The fall-protection harness of claim 4, wherein the second housing is removably disposed on the second side of the fall protection harness.

6. The fall-protection harness of claim 4, wherein the second housing is integrally mounted within the second side of the fall protection harness.

7. The fall-protection harness of claim 1, wherein the connection assembly is selected from at least one of a suspender assembly, a clip and ring assembly, a slot assembly, and a guy-line assembly.

8. The fall-protection harness of claim 7, wherein the slot assembly is selected from at least one of a T-slot assembly and a ball joint assembly.

9. The fall-protection harness of claim 7, wherein the suspender assembly is selected from at least one of a circular suspender assembly, and a diamond suspender assembly.

10. The fall-protection harness of claim 1, wherein the strap may withstand at least 227 kilograms (500 pounds) of weight.

11. The fall protection harness of claim 1 wherein the fall protection harness comprises shoulder straps, leg straps, a seat strap, and a dorsal D-ring, the dorsal D-ring being operatively connected to the shoulder straps proximate a rear portion of the fall protection harness, the seat strap interconnecting the shoulder straps, the leg straps being operatively connected to the seat strap, wherein a worker donning the fall protection harness is suspended in a relatively upright position by the dorsal D-ring when a fall occurs, the dorsal D-ring pulling the fall protection harness upward relative to the worker, the fall protection harness placing pressure on the worker.

12. The suspension trauma relief strap assembly of claim 11, wherein when the connection assembly is formed the worker can stand on the strap.

13. The fall-protection harness of claim 1 wherein the first housing is non-removably fixed to the seat strap of the fall-protection harness.

14. The fall-protection harness of claim 1 wherein the first housing is not fixed to the seat strap of the fall-protection harness.

15. The fall-protection harness of claim 1 wherein the first housing comprises a first major face that is oriented toward the seat strap and a second, opposing major face that is oriented toward the shoulder strap, and wherein a side of the first housing that is between the first and second major faces of the first housing, comprises a slot that is openable to remove the strap from the first housing, the slot having a closure mechanism.

16. The fall-protection harness of claim 15 wherein the closure mechanism of the slot in the side of the first housing comprises a zipper.

17. The fall-protection harness of claim 15 wherein the connector at the second end of the strap is held within the first housing.

18. The fall-protection harness of claim 17 further comprising a pull tab configured to pull the connector and the strap out of the slot in the side of the first housing.

19. The fall-protection harness of claim 17 wherein the suspension trauma relief strap assembly is attached to the fall protection harness by being sewn directly to the fall protection harness.

20. The fall-protection harness of claim 1 wherein the first end of the strap is permanently attached to the first housing.

21. The fall-protection harness of claim 1 wherein the first housing is non-removably fixed to the shoulder strap by way of at least a side of the first housing being stitched to the shoulder strap of the fall protection harness.

22. The fall-protection harness of claim 1 wherein the first housing comprises an upper side and a lower side, the upper side comprising first and second upper opposing end portions and the lower side comprising first and second lower opposing end portions, wherein:

the first upper opposing end portion of the upper side and the first lower opposing end portion of the lower side are stitched together;

the second upper opposing end portion of the upper side and the second lower opposing end portion of the lower side are stitched together;

and, the upper side comprises an upper central portion and the lower side comprises a lower central portion, with the upper central portion of the upper side and the lower central portion of the lower side being spread apart from each other to provide an interior space of the first housing.

* * * * *